United States Patent
Dubey et al.

(10) Patent No.: US 9,785,685 B2
(45) Date of Patent: Oct. 10, 2017

(54) ENTERPRISE APPLICATION WORKCENTER

(75) Inventors: Richa Dubey, Fremont, CA (US); Bill Tsang, Hayward, CA (US); Yachuan (Cathy) Kao, Castro Valley, CA (US); Christine E. Libby, Dublin, CA (US); Donald M. Scantland, Jr., Aurora, OH (US); Frederic Portal, Pleasanton, CA (US); Lilli I. Cooper, Pleasanton, CA (US); Lisa B. Murray, Massillon, OH (US); May W. Chau, Pleasanton, CA (US); Roxanne M. Johnson, Tracy, CA (US); Weishin Yin, Cupertino, CA (US); Ellen Werner Blakey, Alameda, CA (US); Bhupinder Singh Sondhi, Fremont, CA (US); Amira A. Morcos, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/234,362

(22) Filed: Sep. 16, 2011

(65) Prior Publication Data
US 2012/0072817 A1    Mar. 22, 2012

Related U.S. Application Data

(60) Provisional application No. 61/384,263, filed on Sep. 18, 2010.

(51) Int. Cl.
G06F 17/00    (2006.01)
G06F 17/30    (2006.01)
G06Q 10/10    (2012.01)

(52) U.S. Cl.
CPC ....... *G06F 17/30554* (2013.01); *G06Q 10/10* (2013.01)

(58) Field of Classification Search
CPC .................. G06F 17/30554; G06F 17/30887
(Continued)

(56) References Cited

U.S. PATENT DOCUMENTS 6,968,331 B2 * 11/2005 Bar-Yossef et al.
7,434,203 B2 * 10/2008 Stienhans et al. ............ 717/120
(Continued)

OTHER PUBLICATIONS

Oracle Peoplesoft Enterprise, PeopleTools 8.51 PeopleBook: People Tools Portal Technologies, Aug. 2010, XP-055026844, pp. i-iv, 25-26, 476-503.
(Continued)

*Primary Examiner* — Stephen Hong
*Assistant Examiner* — Marshon Robinson
(74) *Attorney, Agent, or Firm* — Invoke

(57) ABSTRACT

A first computer system displays a user interface that includes a first portion and a non-overlapping, second portion. The first portion includes a first pagelet that comprises a plurality of first active links. The first portion also includes a second pagelet that includes a plurality of second active links. One of the first active links is activated, and in response the first computer system displays a first user interface in the second area. The first user interface includes a list of first links, wherein the list of first links is displayed while the first active links and the second active links are displayed in the first and second pagelets, respectively.

21 Claims, 14 Drawing Sheets

(58) Field of Classification Search
USPC .................................................. 715/205, 773
See application file for complete search history.

(56) References Cited

U.S. PATENT DOCUMENTS

| | | | |
|---|---|---|---|
| 7,945,850 B2* | 5/2011 | Machalek | G06Q 10/10 715/212 |
| 8,046,273 B2 | 10/2011 | Welter et al. | |
| 2001/0028364 A1* | 10/2001 | Fredell | G06Q 10/06 715/751 |
| 2002/0023122 A1 | 2/2002 | Polizzi et al. | |
| 2003/0140307 A1* | 7/2003 | Bar-Yossef et al. | 715/500 |
| 2004/0199543 A1* | 10/2004 | Braud et al. | 707/104.1 |
| 2004/0237038 A1 | 11/2004 | Stuhec | |
| 2004/0252134 A1 | 12/2004 | Bhatt et al. | |
| 2005/0027574 A1* | 2/2005 | Agrawal et al. | 705/7 |
| 2005/0177507 A1 | 8/2005 | Bandych et al. | |
| 2006/0031849 A1* | 2/2006 | Barta et al. | 719/320 |
| 2006/0184882 A1* | 8/2006 | Molander et al. | 715/733 |
| 2006/0184883 A1* | 8/2006 | Jerrard-Dunne et al. | 715/742 |
| 2006/0195779 A1* | 8/2006 | McElroy et al. | 715/501.1 |
| 2006/0224951 A1* | 10/2006 | Burke et al. | 715/513 |
| 2006/0277089 A1* | 12/2006 | Hubbard et al. | 705/9 |
| 2007/0118446 A1 | 5/2007 | Soehngen et al. | |
| 2007/0162562 A1* | 7/2007 | Kwon et al. | 709/218 |
| 2007/0240063 A1* | 10/2007 | Cheng et al. | 715/741 |
| 2008/0040704 A1* | 2/2008 | Khodabandehloo | G06F 8/73 717/105 |
| 2008/0077980 A1* | 3/2008 | Meyer et al. | 726/12 |
| 2008/0092039 A1* | 4/2008 | Brockway et al. | 715/246 |
| 2008/0120129 A1 | 5/2008 | Seubert et al. | |
| 2008/0165133 A1 | 7/2008 | Blumenberg et al. | 345/173 |
| 2008/0229112 A1* | 9/2008 | Yamauchi | G06F 21/6227 713/183 |
| 2008/0263216 A1* | 10/2008 | Jacob et al. | 709/229 |
| 2009/0006997 A1* | 1/2009 | Jiang et al. | 715/771 |
| 2009/0063990 A1* | 3/2009 | Morris et al. | 715/751 |
| 2009/0070698 A1 | 3/2009 | Shurtleff et al. | |
| 2009/0113310 A1* | 4/2009 | Appleyard et al. | 715/742 |
| 2009/0158190 A1 | 6/2009 | Higginson | 715/773 |
| 2009/0222720 A1* | 9/2009 | Drieschner | 715/234 |
| 2009/0222738 A1* | 9/2009 | Drieschner | 715/739 |
| 2009/0254825 A1* | 10/2009 | Sichart et al. | 715/716 |
| 2010/0058438 A1 | 3/2010 | Rajaram | |
| 2010/0138734 A1* | 6/2010 | Braud et al. | 715/227 |
| 2010/0153515 A1* | 6/2010 | Lau et al. | 709/217 |
| 2010/0332360 A1 | 12/2010 | Nowotny | |
| 2012/0005659 A1 | 1/2012 | Bonanno et al. | |
| 2012/0323953 A1* | 12/2012 | Ortega et al. | 707/767 |
| 2013/0067115 A1* | 3/2013 | Lapanc | 709/245 |
| 2013/0117652 A1* | 5/2013 | Folsom | G06F 17/243 715/222 |

OTHER PUBLICATIONS

Oracle PeopleSoft Enterprise, "PeopleTools 8.51 PeopleBook: PeopleSoft Query", Aug. 31, 2010, 188 pages.
Oracle PeopleSoft Enterprise, "PeopleTools 8.51 PeopleBook: PeopleTools Portal Technologies", Aug. 31, 2010, p. 528.

* cited by examiner

200A

```
MainMenu>SubMenu-1>WorkCenter
```

| Administer Pagelets |
|---|
| My Work |
| ▶ WGroup - 1    206A |
| ⦿ WG1L1 |
| ⦿ WG1L2 |
| ▶ W Group - 2 |
| ⦿ WG2L1 |
| ⦿ WG2L2 |
| Links |
| ▶ LGroup - 1    208A |
| ⦿ LG1L1 |
| ⦿ LG1L2 |
| Reports/Processes |
| ▶ RGroup - 1    210A |
| ⦿ RG1L1 |
| Queries |
| ▶ QGroup - 1    212A |
| ⦿ QG1L1 |

202A

Unit US001    Invoice RE-6611    Amount $800.00

Invoice Status [ New ] 🔍
Invoice Type [ Misc ] 🔍
Invoice Date [ 1/15/11 ] 🔍
Customer [ 1000 ] 🔍
▶ Address
▶ Payment Info

| Line | Product Info | Order Info | Ship Info |

| Sel | Identifier | Description | Quantity | Price |
|---|---|---|---|---|
| ☐ | LC360 | Line Cards | 4 | 200 |

[Approve]  [Assign]  [Save]

[Next]  [Previous]

FIG. 4

Configure Filter Definition

Filter ID [WG1L3F] ←802
Filter Table [BI-HDR] 🔍 ←806
←804

Configure Filter Fields ←808

| Field Name | Field Label ID ←814 | Required Flag | Display Order 810 |
|---|---|---|---|
| Bus_Unit 🔍 | Business Unit 🔍 | ☑ | 1 |
| Bill_Cust 🔍 | Customer 🔍 | ☑ | 2 |

[Add] ←812

[Save] ←816

Configure Filter Values                           1100

Link: WG1L3

*Business Unit [ = ▽]   [US001 🔍]
    Customer [ = ▽]   [CSLLP 🔍]

*FIG. 11*

ENTERPRISE APPLICATION WORKCENTER

This application claims the benefit, under 35 U.S.C. §119(e), of U.S. Provisional Patent Application No. 61/384,263, entitled "Cross Product Workcenter and Process Visualization," filed Sep. 18, 2010, and naming Lilli Cooper et al. as inventors. The above-referenced application is hereby incorporated by reference herein in its entirety.

BACKGROUND

Enterprise applications are well known. An enterprise application is typically hosted on one or more server computer systems (servers) and provides simultaneous services to a large number of users via a network. This is in contrast to a single-user application that is executed on a user's personal computer and serves only one user at a time.

Enterprise applications can assist businesses or other organizations with billing, payment processing, customer relationship management, resource planning, human resource management, etc. The present invention will be described with reference to an enterprise application that provides a billing system it being understood the present invention should not be limited thereto.

BRIEF DESCRIPTION OF THE DRAWINGS

The present invention may be better understood, and its numerous objects, features, and advantages made apparent to those skilled in the art by referencing the accompanying drawings.

FIG. 4 illustrates a graphical representation of an interface opened in the transaction area of a workcenter.

FIG. 8 illustrates a graphical representation of an example filter definition interface that can be used for creating or modifying a filter.

FIG. 11 graphically illustrates an example interface where a user of a workcenter can enter secondary search criteria for a filter mapped to a pagelet link.

The use of the same reference symbols in different drawings indicates similar or identical items.

DETAILED DESCRIPTION

In their day-to-day jobs, users of an enterprise application may navigate through a hierarchy of menus to reach various interfaces or pages. For the purposes of explanation only, the terms "interfaces" and "pages" will be used interchangeably. Once interfaces are reached after navigation, users can perform their jobs by, for example, creating new documents (e.g., an invoice or other objects stored in a memory system such as a database), searching for existing documents to update, scheduling a batch process, etc. Menu navigation, unfortunately, can be time consuming and complex, particularly for those users who are not familiar with the enterprise application.

An enterprise application interface called workcenter is disclosed. Workcenter may enable users to more easily, effectively, and efficiently work with an enterprise application in their day-to-day jobs. A workcenter can notify users of work items for which they are responsible. These work items can vary in type and include finalizing documents, approving documents, correcting documents that lead to processing errors, etc. Workcenter can display work items assigned to users based on their roles in an organization such as a business. Importantly, workcenter can display work items without traditional menu navigation to interfaces where users enter selection criteria to "pull" or identify work items for which they are responsible. As will be more fully described below, workcenters can be created by administrators for users according to their roles within a business; one workcenter may be created for a group of billing clerks, while a different workcenter may be created for a group of accounts payable clerks. Further, as will be more fully described below, users can individually configure their respective workcenters. Further aspects of workcenter will be described below.

The present invention is described below in connection with several embodiments. However, the present invention is not intended to be limited to the specific forms set forth herein. References in the specification to "one embodiment" or "an embodiment" means that a particular feature, structure, or characteristic described in connection with the embodiment is included in at least one embodiment of the present invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
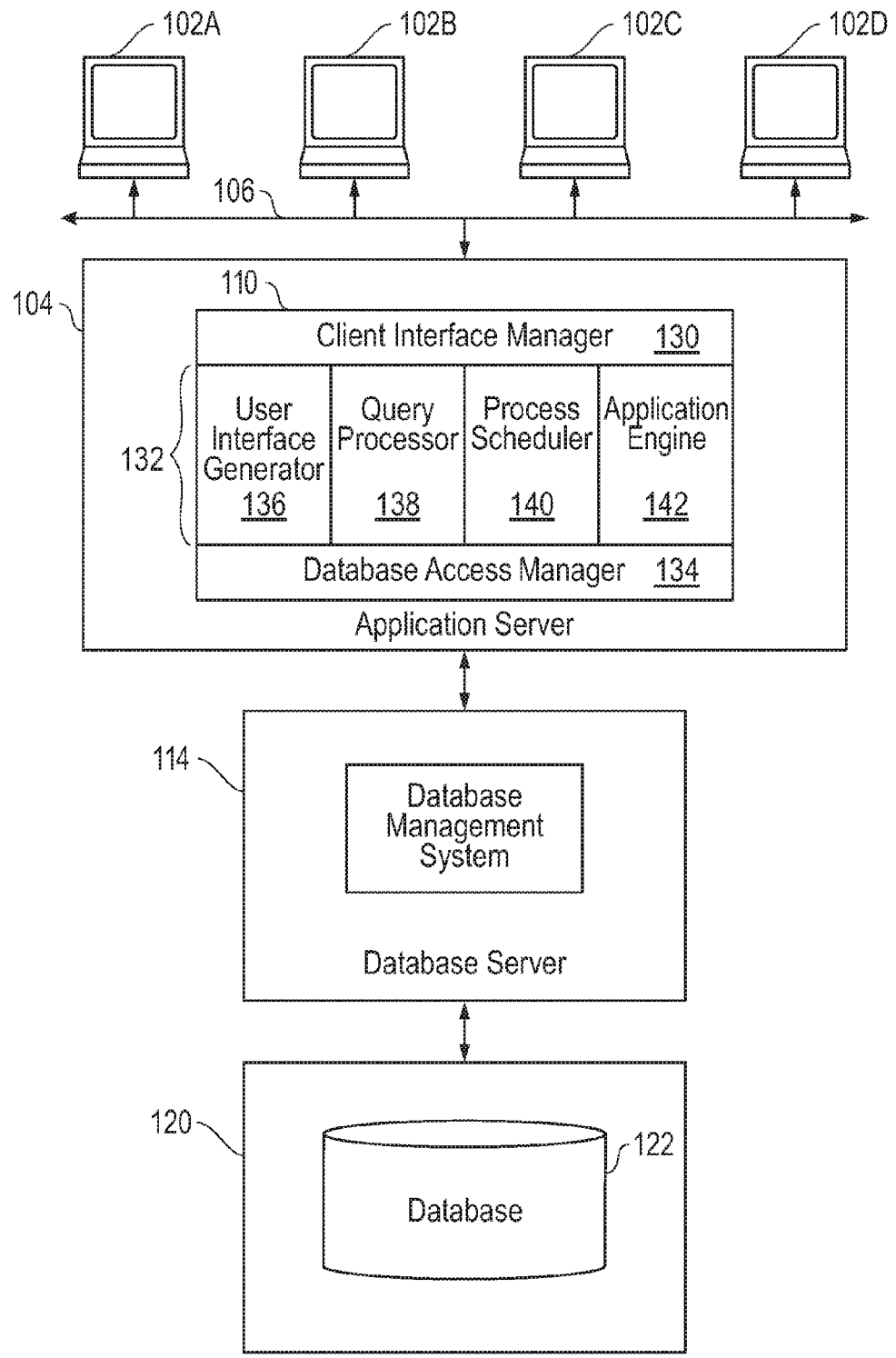
FIG. 1 illustrates relevant components of a system that implements an example enterprise application.

FIG. 1 illustrates relevant components of a system 100 that implements an example enterprise application. System 100 includes client computer systems (clients) 102 in data communication with at least one application server 104 via network 106. Application server 104 includes an enterprise application system 110 that may take form in software instructions executing on one or more processors. The software instructions may be stored in one or more conventional computer readable mediums that may include, for example: magnetic storage media such as a magnetic disk (e.g., a disk drive); optical storage media such as an optical disk; solid state electronic storage devices such as random access memory (RAM), or read-only memory (ROM); or any other device or medium employed to store computer executable software instructions. Those skilled in the art will readily recognize that the enterprise application system 110 may be constructed in hardware or a combination of hardware and software.

Enterprise application system 110 is in data communication with database server 114, which in turn is in data communication with a storage area network (SAN) 120 that may take form in interconnected components such as storage devices (e.g., disk arrays), routers, switches, bridges, etc. SAN 120 may present several databases (e.g., relational databases) for access by software (e.g., a database management system) executing on database server 114. The present invention, however, will be described with reference to a single relational database 122, it being understood that the present invention should not be limited thereto.

On a conceptual level a relational database generally includes a collection of tables, each of which may contain one or more records or rows. Each record may have one or more fields that contain data. Each record also includes a primary key that makes each record unique in a relational database. Primary keys alleviate the possibility of a duplicate record in a table.

Tables of a relational database can be related to one another. Tables can be related to allow data to be retrieved in a single query, although the data sought by the query may exist in more than one table. Data from multiple tables can be joined to form one large result set.

Enterprise application system 110 may generate SQL commands in response to actions such as creating or updating a document, which are initiated by users via interfaces displayed on monitors of clients 102. These SQL commands in turn are implemented by the database management system of database server 114 against database 122.

There are multiple SQL commands that can be generated by enterprise application system 110. The SQL commands, when implemented, build tables, manipulate tables, populate tables with data, update existing data in tables, delete data, perform database queries, etc. For example, enterprise application system 110 may generate a SQL command for creating a table in database 122 to store the results of a batch process that is implemented by enterprise application system 110.

Enterprise application system 110 can generate SQL commands that manipulate data contained within one or more records of one or more existing tables of database 122. There are three basic data manipulation SQL commands: insert, update, and delete. The insert command is used to insert new data into a table. Preexisting data in a table can be modified using the update command. The delete command can be used to remove entire rows of data from a table. Enterprise application system 110 can also generate SQL commands to extract data from the database 122. The extracted data can be further processed by enterprise application system 110 and/or presented to a user via a page displayed on a client 102.

Enterprise application system 110 may include a client interface manager 130 that enables communication between clients 102 and core modules 132. Enterprise application system 110 may also include a database access manager 134 that enables communication between a database management system of database server 114 and core modules 132. The core modules 132 provide diverse functions to users of enterprise application system 110 and may include an interface generator, various processors including a query processor, a process scheduler, an application engine, etc. In addition to communicating with the client interface manager 130 and database access manager 134, core modules 132 are capable of communicating with each other. For example, the application engine may include a component that can finalize documents (e.g., invoices) in accordance with information (e.g., run time control variables, process start time, etc.) provided by the process scheduler. Query processor may receive the results of a query implemented against database 122 via SQL commands, and in turn provide information to the interface generator, which in turn generates a search results page for subsequent transfer and display on one of the clients 102 via client interface manager 130.

Interfaces enable users to work with enterprise application system 110 via their clients 102. Interfaces may include components (e.g., buttons, links, etc.) that start an action (e.g., save a document, schedule a batch process, etc.) when activated by a user. "Search" buttons, when activated start a search using search criteria entered by a user into one or more fields of a page. "Apply" buttons are usually found on a page that was opened by activating a prompt button. The Apply button, when activated, enables the user to apply data input. The Apply button is available on a modal window where it gives the user the ability to apply their changes and remain in that page. Or the user can choose to make changes and select an OK button which applies the changes but closes the modal window and returns the user to the 'source' window. A "run" button can be used to open a request dialog box where the user can set up process control parameters for scheduling a process. Other page components are contemplated.

Interfaces of enterprise application system 110 may include several types of data entry fields. Users can directly type data into some fields. Other fields such as radio buttons or drop-down list boxes present the user with a list of choices that can be entered. Prompts are small buttons that resemble a magnifying glass to the right of some fields. The prompt button enables a user to open a separate page, which allows the user to look up a field value from a list (the example is prompt on customer ID). Selecting the magnifying glass takes the user to a page where they can search within the customer ID result set for the value they want. They select the value they want, select OK and are returned to the calling page with that value filled in.

With continuing reference to FIG. 1, enterprise application system 110 implements business processes. Users may interact with each other via business processes. For example, when an employee creates an invoice in database 122 using his client 102, that employee may start a business process in which a manager is prompted to review and approve the invoice. The term workflow often refers to these larger business processes.

Workflow can be seen as business events and routings associated with those events. A business event is a condition that tells enterprise application system 110 something of interest has occurred. Example business events may include: the creation of a new document (e.g., an invoice) in database 122, a change in a record field to a particular value, the passing of a due date, etc. A routing is an instruction that tells enterprise application system 110 to forward information in accordance with the next step, which is typically an approval, in the business process. It specifies what information to forward and where to forward it. When a user saves data entered into a page displayed on client 102, the enterprise application system 110 may check to see whether an event has occurred, and if it has, an associated routing is triggered. Because the enterprise application system knows the big picture and knows what is attempting to be accomplished, the enterprise application system can automatically start the next step (e.g., assigning a task of approving an invoice) in a workflow based on predetermined approval rules.

Beginning with a home page or main menu, users can navigate to a page where they can, for example, view a list of tasks (e.g., notifications of documents that need approval) assigned to them as a result of workflow routings. Work lists help identify some work users need to do and make it easier to get to the appropriate pages to do that work. When a task (e.g., approve an invoice) is routed to a user, it can be put in the user's work list, which can be displayed as a page on a client 102 after user navigation thereto. Each task in the list may contain an active link to another page. To work on a particular task, the user can click on the active link, which automatically takes the user to another page where an action can be performed. Worklists, however, are used for approvals as opposed to generalized tasks. The approval action is taken from the worklist, not from another page. When an action is taken on a work list item, the user has to reinitiate the menu navigation to the work lit in order to work on the next item thereof. More importantly, workflow is limited in its ability to route tasks to worklists. Users who seek tasks other than approvals for which they are responsible, are required to undertake a search that involves extensive, complex, and time consuming menu navigation.

Complex menu navigation is often required when using other features of enterprise application system 110. For example, users may need to undertake a complex and lengthy menu navigation to schedule batch processing jobs. A batch process is a predefined process or program of enterprise application system 110 that runs independent of any end user intervention. Off line batch processes are used, for example, to generate final invoices and update accounting books. Batch processes are typically run in the background, often at night, when other users are not using enterprise application system 110.

Scheduling a batch process can be complicated for a user. First, users may be required to menu navigate to a schedule manager page. After menu navigation, the user enters a run control ID into one page. Then another page may be displayed that allows the user to enter specific parameters for the process. Once the parameters are identified, the user can click a run button, which prompts a process schedule request page. This page can be used to submit a process request, and shows the options that the user has selected for the particular process request and what processes are available. Sometimes the options available to the user on this page may be determined by a security profile. Each user of enterprise application system 110 may be linked to one or more roles. A role is a group of end users with a specific identity, and each role has one or more permission lists that control what a user can and can't access. Typically, a user can only run processes that are associated with his permission list. Ultimately, extensive menu navigation and complicated entry of run controls and other data may be needed to successfully schedule a process.

Enterprise application system 110 generates reports that are used by users in their day-to-day jobs. Reports can be used to see the results of prior processing jobs. Unfortunately, the procedure to see a report may be require extensive menu navigation to several distinct pages where a user can select a report sought to be generated, enter parameters needed to generate the report, specify where and when the user wants the report to run, choose the report output type and report distribution method, etc. To illustrate, enterprise application system 110 may include a reports menu that lists available reports that can be implemented by enterprise application system 110. A separate report manager interface may be needed to view results of a report after it is generated. To get to the reports menu, the user may have to navigate from the main menu. After selecting a report from a list provided by the report manager, the user may have to further navigate to a run control page where the user can tell the system when and where to print the report. For most reports, the user sets up parameters to filter the content of the report, such as the business unit or the time period on which to report, which in turn may require still further menu navigation. A run control is a database record that provides values for these settings. Instead of entering these same values each the time a report is run, the user can create (and save) a run control with these settings. The next time the user seeks to run a report, the user can navigate to and select the run control, and the system fills in the settings. Each generated report is assigned a unique process instance number.

A user can navigate to yet another page to check the status of a process or report, which is an example of another type of task that may not or cannot be the subject of a workflow routing. A process monitor is a tool within enterprise application system 110 that is designed to track the status of all processes and reports. Depending on how much data is sought to be processed by a request and depending upon the system's current processing load, the process or report sought may take considerable amount of time to run. A page displays the status, which may include initiated, processing, completed, etc.

Enterprise application system 110 may include an events and notification component that can be configured and used to monitor batch processes and create alerts when unusual situations or errors occur. One or more users are assigned the job of resolving these errors. In one embodiment, a batch process can be monitored for alerts by querying a database table into which process results are stored. The database table may contain alert messages that were generated when errors (e.g., an invalid credit card number) are found during the batch process. Users can menu navigate to a search page, which can be used to find alerts for which they are responsible. Search results can be presented to the user on a page with links to other pages, respectively, that contain more detailed information and where a user can review and/or correct issues that gave rise to the errors.

Users of client computer system 102 are also capable of accessing data stored within database 122 using preset or existing queries, or after creating new queries. To locate an existing query, the user can navigate to a basic query search page, where the user can search for an existing query by entering, for example, the first few characters of the query name into fields of the query search page. The queries that match the user's search criteria can be subsequently displayed in a result page. The results page lists items with a link that can be activated by the user, which in turn takes the user to another page where the selected query can be run. This page may include fields into which parameters of the selected query can be entered. Once the search criteria are entered into the appropriate fields, the user can run the query and view the results thereof.

When a user wants to perform some action such as create an invoice, approve an invoice, run a batch process to finalize approved invoices, view a report, etc., the user can menu navigate to the appropriate page where the action can be started. Each navigation may start with a main menu or home page and subsequently proceed through at least one sub-menu before the user opens the needed page. Once the page is reached, the user may need to enter information such as search criteria, run-control variables, etc., before activating a command. In this manner, users can view results from processes that ran overnight, find alerts on items that were not processed correctly because of errors, etc. With menu navigation, a user can open a page that lists links to items (e.g., invoices) he created. When one of the items is opened by activating a link, the user can perform some action such as edit, view—proforma, etc. But when the user wants to work on the next item he created, the user may need to repeat the same menu navigation to reach the page that lists the links to the items.

Users may perform many different menu navigations during the course of a day, each one of which can be time-consuming and challenging particularly for those users who are unfamiliar with the menu structure of an enterprise application system. Moreover, traditional menu navigation may leave users with multiple open pages, which often leads to user confusion and mistakes. A workcenter interface (hereinafter workcenter) provides an alternative and potentially more efficient method for users to work on their assigned tasks and use enterprise application system 110. Workcenters can provide quick and easy access to varied lists of work items assigned to users. Workcenters can also provide quick and easy method of scheduling a batch processing job, generating a report, or starting a query. Further advantages of workcenters are described more fully below.

Figure 2A:
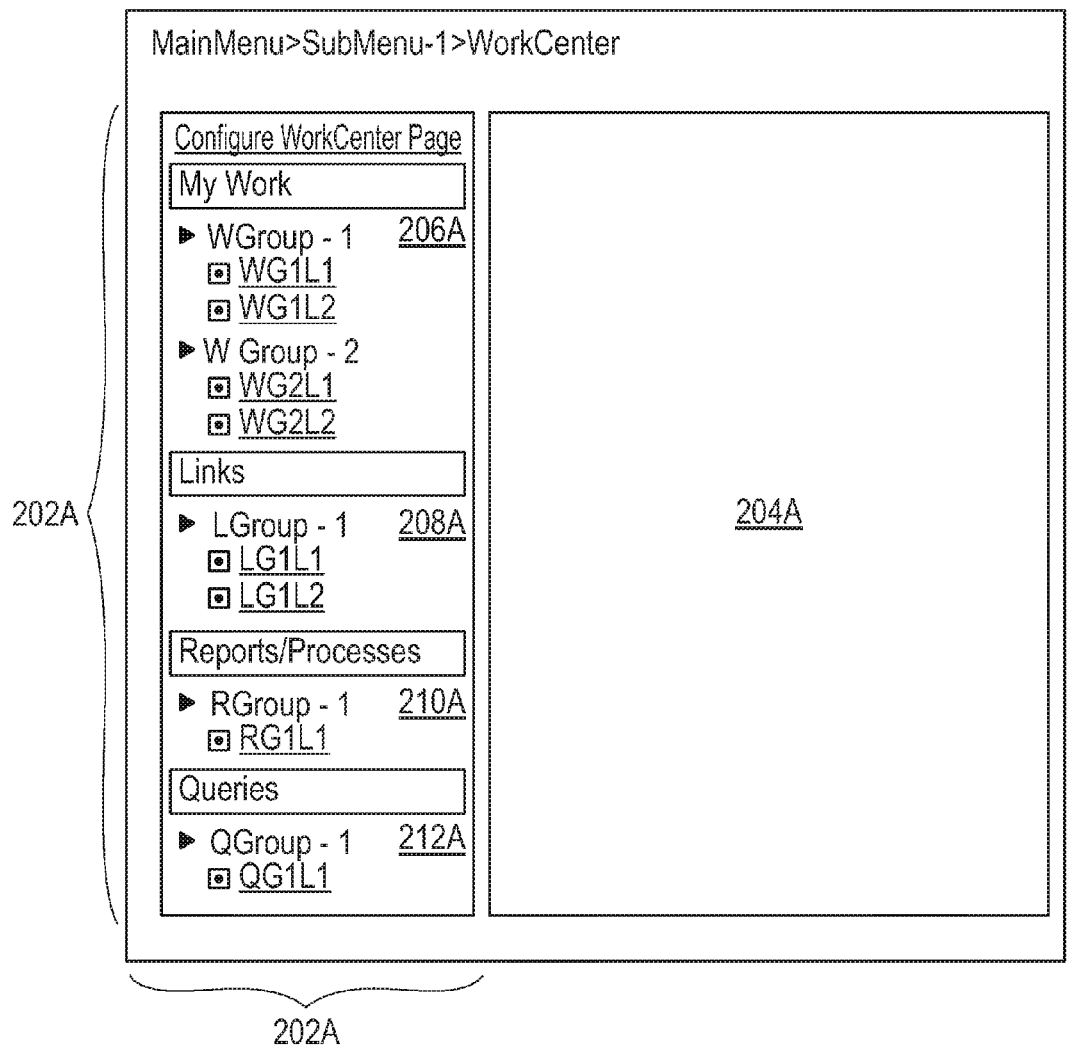
FIGS. 2A-2C illustrate graphical representations of example workcenters.
Figure 2B:
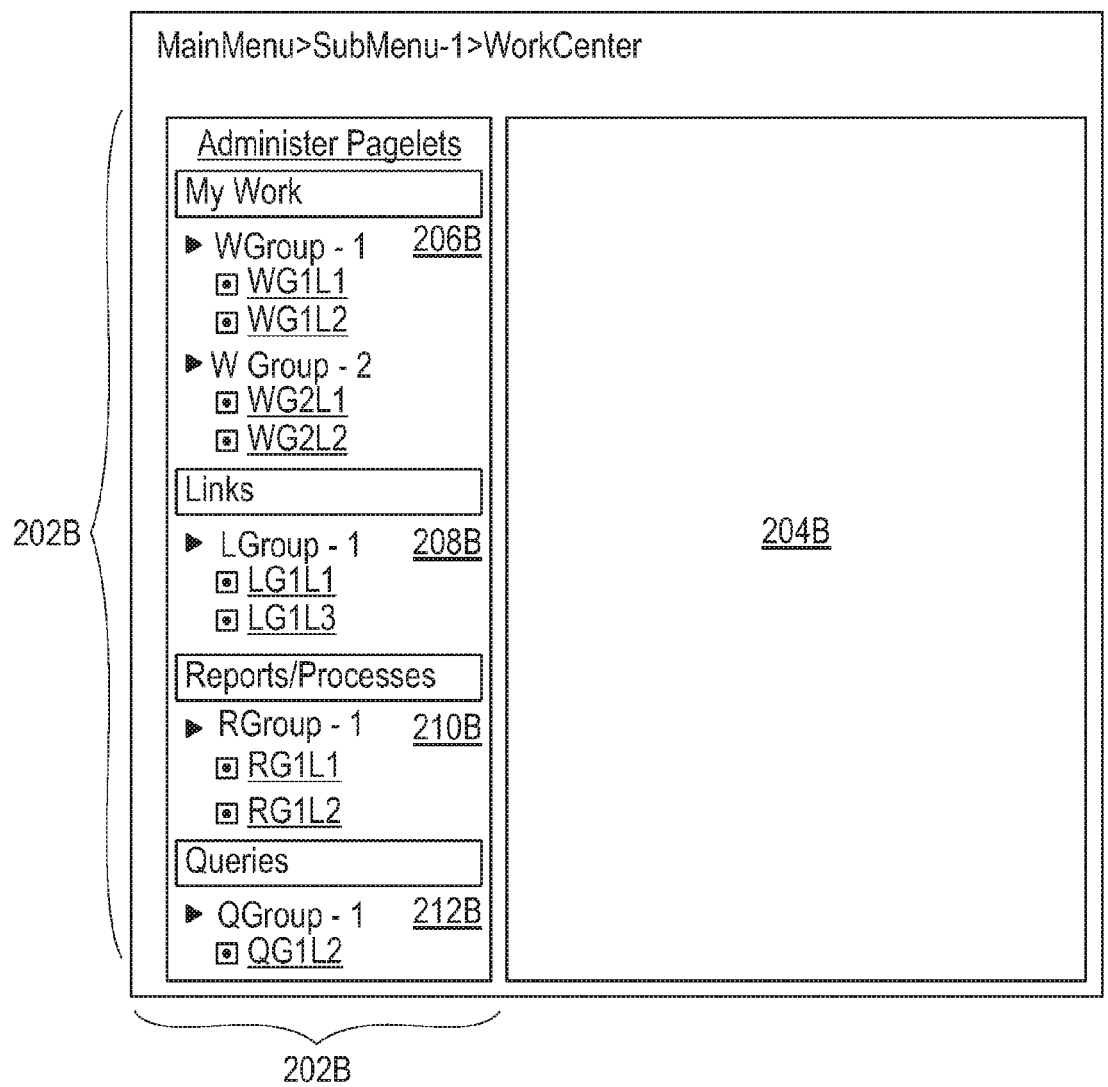
Figure 2C:
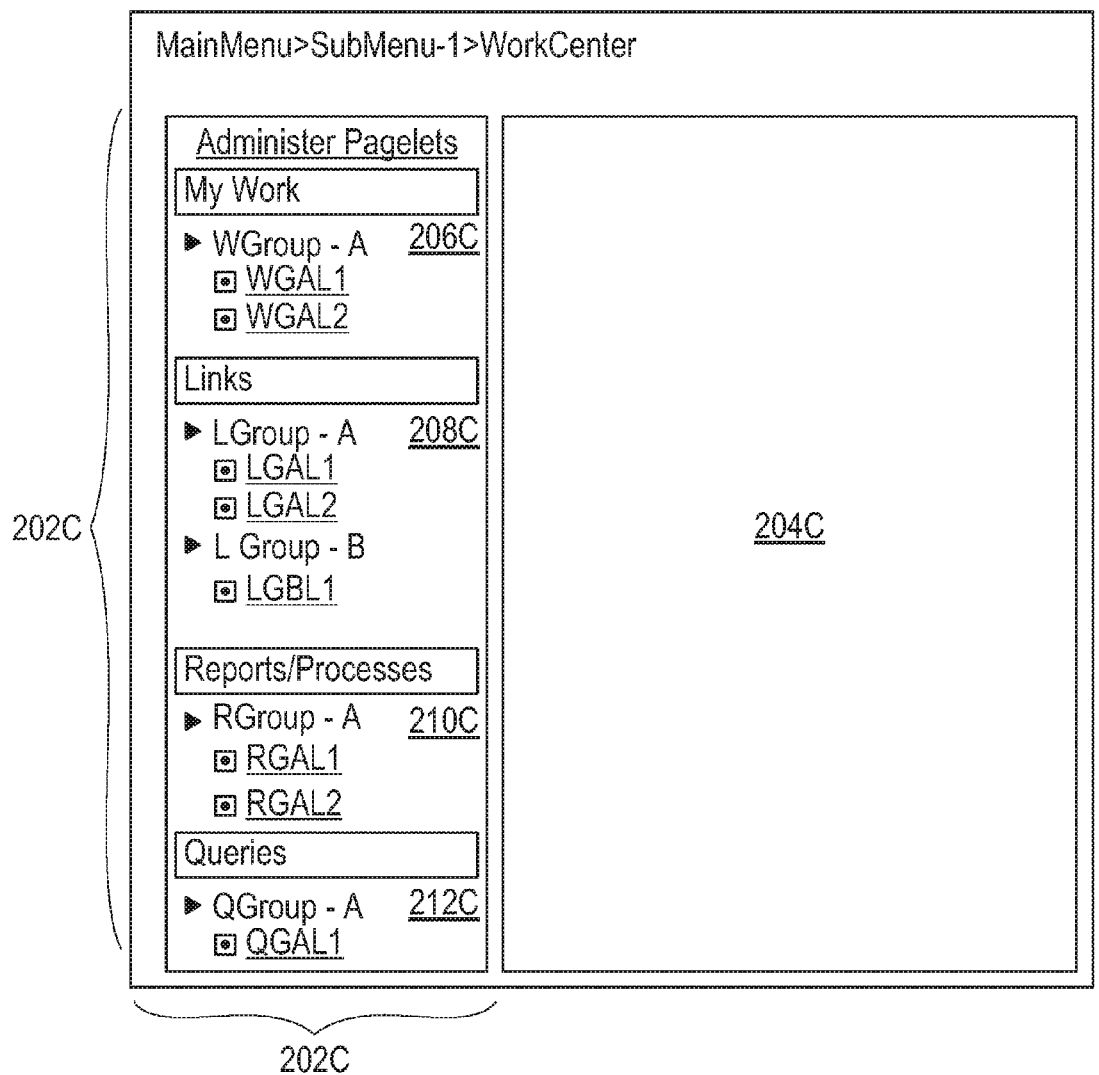

After logging into enterprise application system 110, users can navigate to their respective workcenters from the main menu or home page. FIGS. 2A-2C illustrate graphical representations of example workcenters 200A-200C, respectively, that can be displayed on monitors of clients 102A-102C, respectively. Each workcenter 200 includes a pagelet area 202 and a transaction area 204. A link entitled "Configure WorkCenter Page" that when activated (e.g., clicked) opens a separate page where a user can configure aspects of the user's workcenter such as the display order in which pagelets or work groups, more fully described below, are presented. In the illustrated examples, workcenters 200A and 200B were created for users that have a similar role (e.g., billing clerks), while workcenter 200C was been created for a user with a different role (e.g., accounts payable clerk).

Pagelet area 202 in each of the illustrated workcenters may include one or more pagelets. Pagelets 206-208 are designated My Work, Links, Reports, and Queries, respectively. Each pagelet may include one or more groups (e.g., WGroup-1), which in turn may include one or more active links to grids or pages that can be displayed in transaction area 204. In one embodiment, transaction area 204 may display a grid or page while the pagelet links are concurrently displayed in pagelet area 202. For ease of explanation, the term page is presumed to include grids. Pages displayed in transaction area 204 may be internal to enterprise application system 110 or external thereto (e.g., facebook.com).

Pages opened in transaction area 204 can be the same as or similar to pages that a user can open without using his workcenter. In other words, a page opened in transaction area 204 may the same as or similar to pages that a user can open through traditional menu navigation that begins with the main menu or home page of enterprise application system 110. To illustrate this concept, a My Work pagelet link activated in workcenter 200 may open a list of tasks or work items in transaction area 204 that are assigned to the user. The same or similar page could be opened after (1) the user menu navigates to a page that lists several existing searches, (2) the user selects one of the existing searches, and (3) the user enters appropriate search criteria and starts the selected search. Clearly, traditional menu navigation may take more time and effort then simply opening a corresponding page in transaction area 204 via pagelet link activation. For some of the My Work links, in one embodiment, transaction area 204 displays results (e.g., a list tasks or work items) that the user can't navigate to using traditional menu navigation unless the user writes a complex query, or if the user could navigate using traditional menu navigation, the user would see the results one by one as opposed to seeing results displayed as a group or list.

Transaction area 204 can display a list of tasks or work items assigned to the user in response to the user's activation of a corresponding pagelet link in My Work 206. Each entry of the displayed list may include a link to another page that can be opened in a modal/modeless window, which contains more details about the work item, and where the user can start an action (e.g., approve or modify contents of an invoice). Closing that window will return the user to transaction area 204 and to the displayed list of work items therein.

Transaction area 204 can display a page internal to enterprise application system 110 (e.g. list of clients) or a page external to enterprise application system 110 (e.g., facebook.com) in response to the user activating a corresponding pagelet link in Links 208. A user can personalize Links by adding favorite links to menu items in enterprise application system 110 or uniform resource locators (URLs).

Transaction area 204 can display a report or a page for scheduling a batch processing job in response to the user activating a corresponding pagelet link in Reports/Processes 210. Each pagelet link in Reports/Processes may be mapped to a respective data object that stores run control or other parameters that are needed to schedule a respective batch processing job or generate a respective report. When a user activates a Reports/Processes link, enterprise application system 110 may generate a report using the previously specified run control or other parameters that are mapped to the link. In other words, there is no intervening step of user entry of run control or other parameters between user activation of the My Reports link and the subsequent display of the generated report in transaction area 204. In one embodiment, the generated report generally does not appear in the transaction area but may display in a new window or can be accessed through a reporting console.

Transaction area 204 can display a query interface in response to user activation of a corresponding pagelet link in Queries 212. Further, transaction area 204 can display results of a query started by the user when she activates a button on the query interface displayed in transaction area. Transaction area 204 can also display results of a query in response to user activation of a link in Queries 212 without intervention by the user. However, if the query requires user input before the query is executed and results returned, the user will enter the needed input. Other pagelet links are contemplated, and the current invention should not be limited to the pagelet links expressly described herein or shown in the Figures.

As noted above, transaction area 204 can display a list of tasks or work items (hereinafter work items) assigned to the user of the workcenter. The My Work pagelet in FIGS. 2A and 2B includes one or more groups (e.g., WGroup-1 and WGroup-2), each having active links to respective lists of work items that can be displayed in transaction area 204. The displayed lists may contain different types of work items assigned to the user of the workcenter. One My Work pagelet link of the workcenter may be connected to a list of one type of work items (e.g., approve a subset of vouchers). Another My Work pagelet link may be connected to a list of another type of work items (e.g., schedule several batch processing jobs to process accounts payable checks). Still another My Work pagelet link may be connected a list of yet another type of work items (e.g., fix invoices that created alerts when they were batch processed).

Each work item displayed in transaction area 204 may contain a link to a page that can be subsequently displayed in a new page outside of transaction area 204 where the user can see more details about the work item and perform some action. An action (e.g. approve invoice) can be performed in parallel on several work items displayed in transaction area 204. Each list displayed in transaction area 204 may be created by enterprise application system 110 in response to implementing a respective, existing search as will be more fully described below.

Figure 3A:
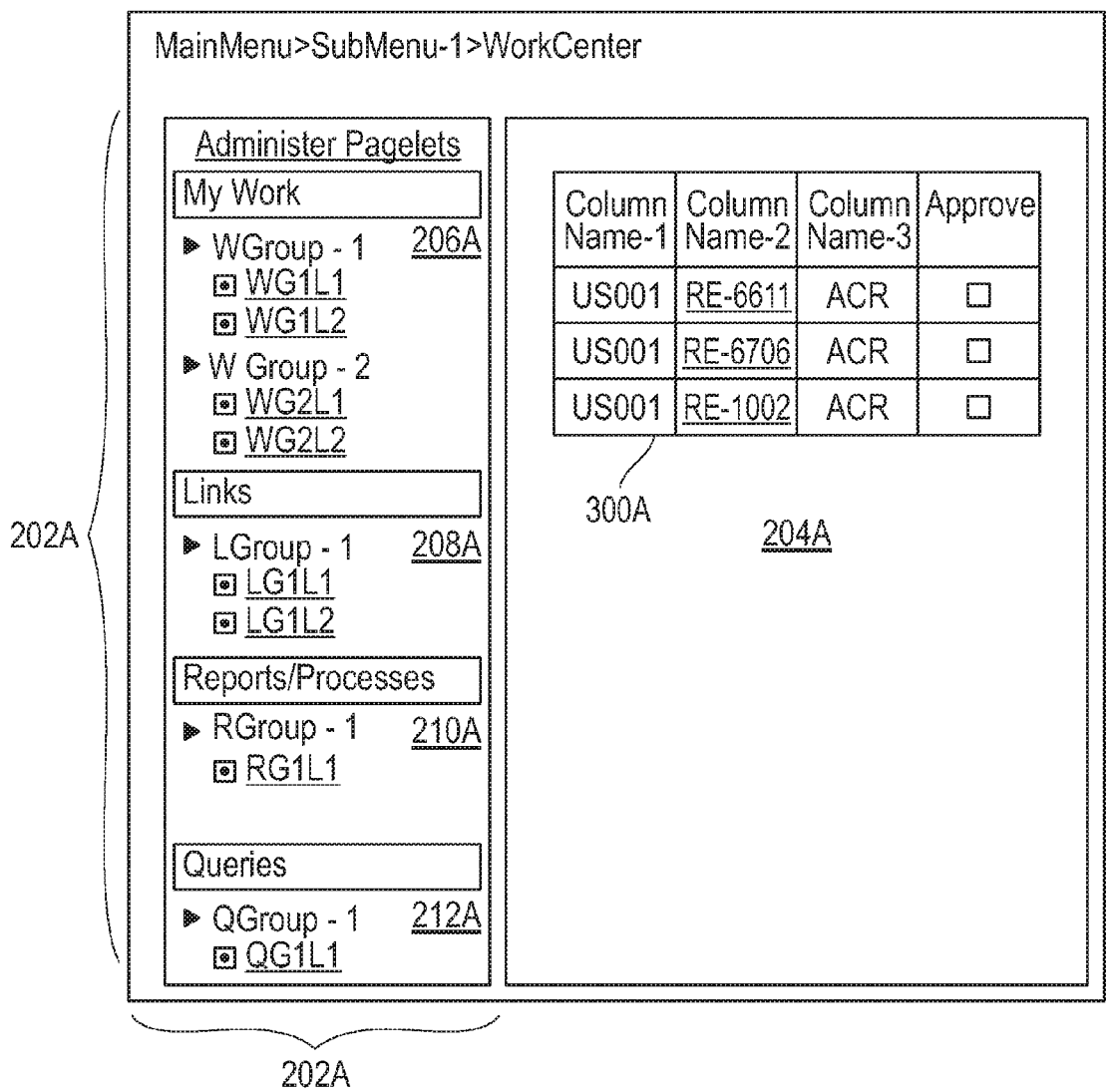
FIGS. 3A and 3B illustrate graphical representations of interfaces opened in transaction areas of respective workcenters.
Figure 3B:
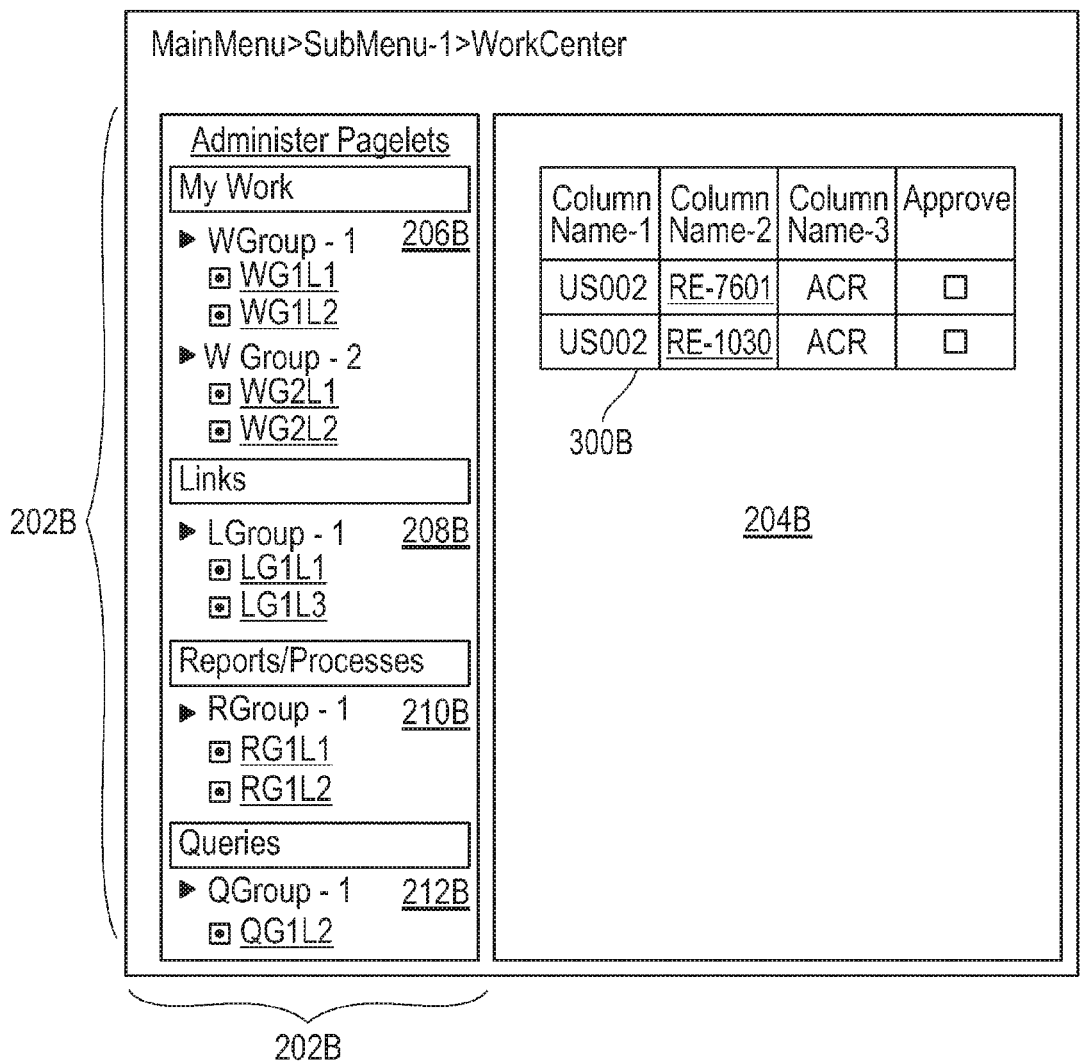

Pagelets in different workcenters 200 may display common links. However, distinct pages may be opened in transaction area 204 in response to user activation of common links. To illustrate, when the user of workcenter 200A activates My Work pagelet link WG1L1, page 300A is opened as shown in FIG. 3A. Similarly, when the user of workcenter 200B activates My Work pagelet WG1L1, a different page 300B is opened as shown in FIG. 3B. The difference in pages opened in transaction area 204 may result from users individually configuring their workcenters as will be more fully described below.

My Work pagelets may contain links to lists of work items that can be found in database 122 by existing searches after the results of the existing searches are filtered according to user defined secondary search criteria. Enterprise application system 110 contains various frameworks that provide existing searches to find work items. In one embodiment, as will be more fully described below, My Work pagelet links can be mapped to respective, existing searches. Further, the pagelet link in a particular workcenter may be mapped to secondary search criteria preselected by a user via a corresponding filter. In this configuration, when the pagelet link is activated by the user, the mapped existing search is implemented by enterprise application 110 to identify relevant work items. The identified work items are subsequently filtered by enterprise application system 110 using the secondary search criteria mapped to the pagelet link. The results of this filtering are subsequently displayed in transaction area 204. To illustrate, pagelet link WG1L1 of workcenters 200A and 200B are each mapped to an existing search for particular work items (e.g., invoices that need approval). Distinct secondary search criteria may be entered by separate users and mapped to links WG1L1 of workcenters 200A and 200B. When the user of workcenter 200A activates his pagelet link WG1L1, enterprise application system 110 implements the existing search mapped to WG1L1. Thereafter, enterprise application system 110 filters the results of the existing search using the secondary search criteria mapped to the link. The filtered results are displayed as shown, for example, in FIG. 3A. In similar fashion, when the user of workcenter 200B activates his pagelet link WG1L1, enterprise application system 110 implements the same search that is mapped to WG1L1 of workcenter 200A, which is also mapped to WG1L1 of workcenter 200B. Thereafter, enterprise application system 110 filters the search results using the secondary search criteria mapped to WG1L1 of workcenter 200B. The filtered results are subsequently displayed in the transaction area 204B as shown, for example, in FIG. 3B.

A page opened in transaction area 204 may include active links to other pages in enterprise application system 110 or to other pages external to enterprise application system 110. Page 300A of FIG. 3A includes a list with three active links, while the page 300B of FIG. 3B includes a list with two active links. When activated each of the links of page 300A opens a new page outside of the transaction area in one embodiment. For the purposes of explanation only, the newly opened page will be initially sized to overlap the transaction area 204. Likewise, when activated each of the links of page 300B opens a new page within transaction area 204B. Again, the newly opened page will be initially sized to overlap the transaction area 204. To illustrate, if the user of page 300A activates link RE-6611, a new page will be opened as shown in FIG. 4. Although not shown this new page may include links to further pages that can be displayed. Once the user finishes with the new page the user might activate an "OK" button to dismiss the new page or if the user has changed data, might elect to save via activation of another button.

A new page opened in response to activating a link in the transaction area 204 may enable a user to perform an action. FIG. 4, for example, shows an invoice that has been opened in the new page. A user can add new data to or modify existing data of the invoice. The user can approve the invoice by activating the "approve" button. The user can reassign the invoice to another person using the "Assign" button. In other pages displayed in transaction area 204, a user can schedule a batch process to be performed by enterprise application system 110, for example, to finalize approved invoices. Other enterprise application actions can be started using pages opened in transaction area 204.

Figure 5:
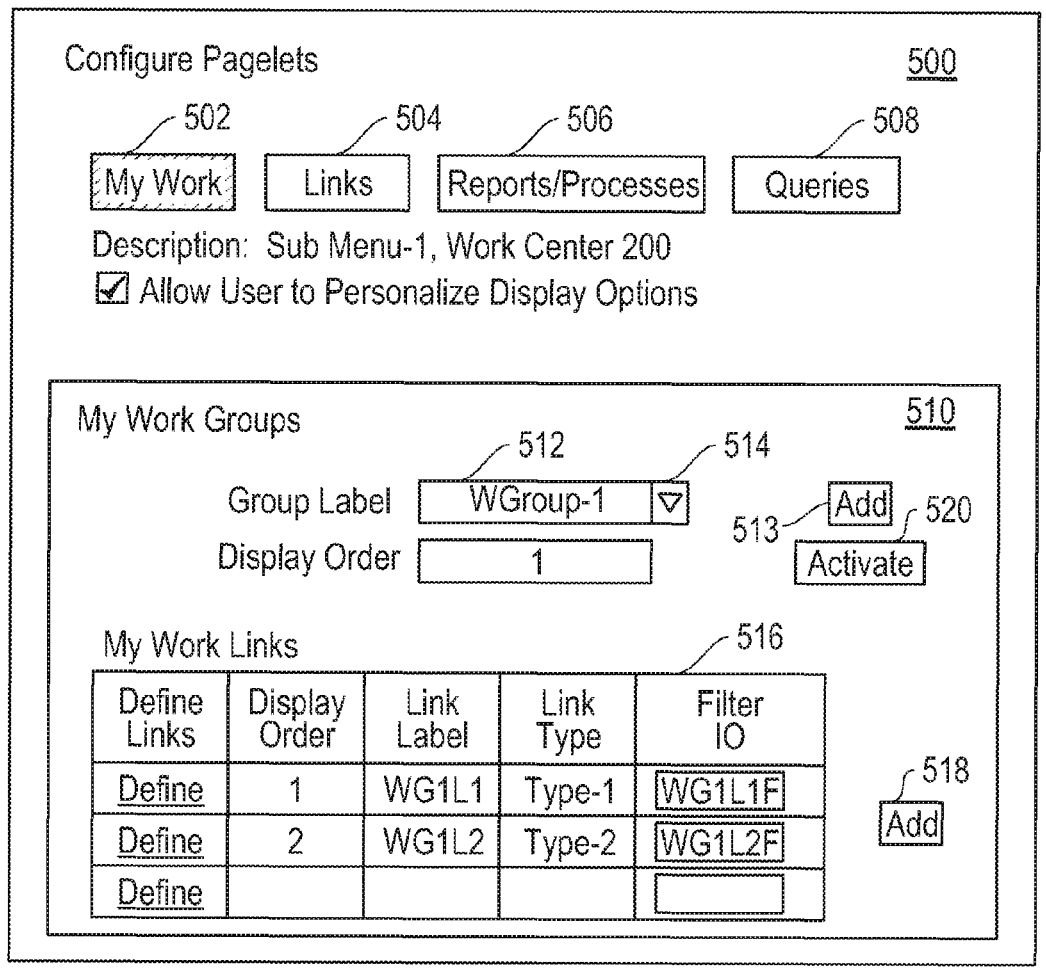
FIG. 5 illustrates a graphical representation of an example workcenter configuration interface

An administrator may create different workcenters for different user roles. One workcenter can be created, for example, for users who are billing clerks, while another workcenter can be created for users who are accounts payable clerks. Enterprise application system 110 provides a workcenter configuration interface where an administrator can create a new workcenter or modify an existing workcenter. FIG. 5 illustrates a graphical representation of an example workcenter configuration interface 500. The workcenter configuration interface will be described with reference to modifying the workcenters 200A and 200B shown within FIGS. 2A and 2B. However, the same concepts described below with respect to FIG. 5 apply to the creation of new workcenters.

Workcenter configuration interface 500 includes tabs 502-508 that correspond to respective pagelets (i.e., My Work, Links, Reports/Processes, and Queries) of workcenters 200A and 200B. Workcenter configuration interface 500 displays a pagelet configuration sub-interface when one of these tabs is activated. In FIG. 5 an example "My Work" pagelet configuration sub-interface 510 is displayed. Sub-interfaces can be used to access or modify the settings for each group. For example, the My Work pagelet configuration sub-interface 510 can be used to access or modify the settings for each group of the My Work pagelet. In the illustrated example, sub-interface 510 displays the My Work active links for group WGroup-1. The administrator can display alternative groups using drop down button 514 or add a new group using the add button 513.

Sub-interface 510 includes table 516, which includes entries corresponding to respective active links that are contained in WGroup-1 of FIGS. 2A and 2B. By activating the add button 518, an administrator can add a new link entry to table 516. By activating the "define" link in an entry, the administrator can modify the contents of the entry. Sub-interface 510 displays an undefined link that was added to table 516 after administrator activation of add button 518.

Figure 6:
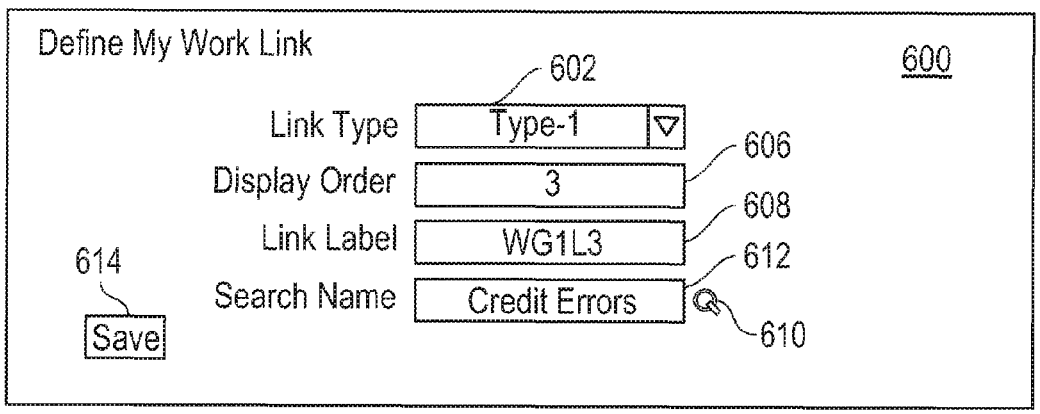
FIG. 6 illustrates a graphical representation of an example link definition interface
Figure 7:
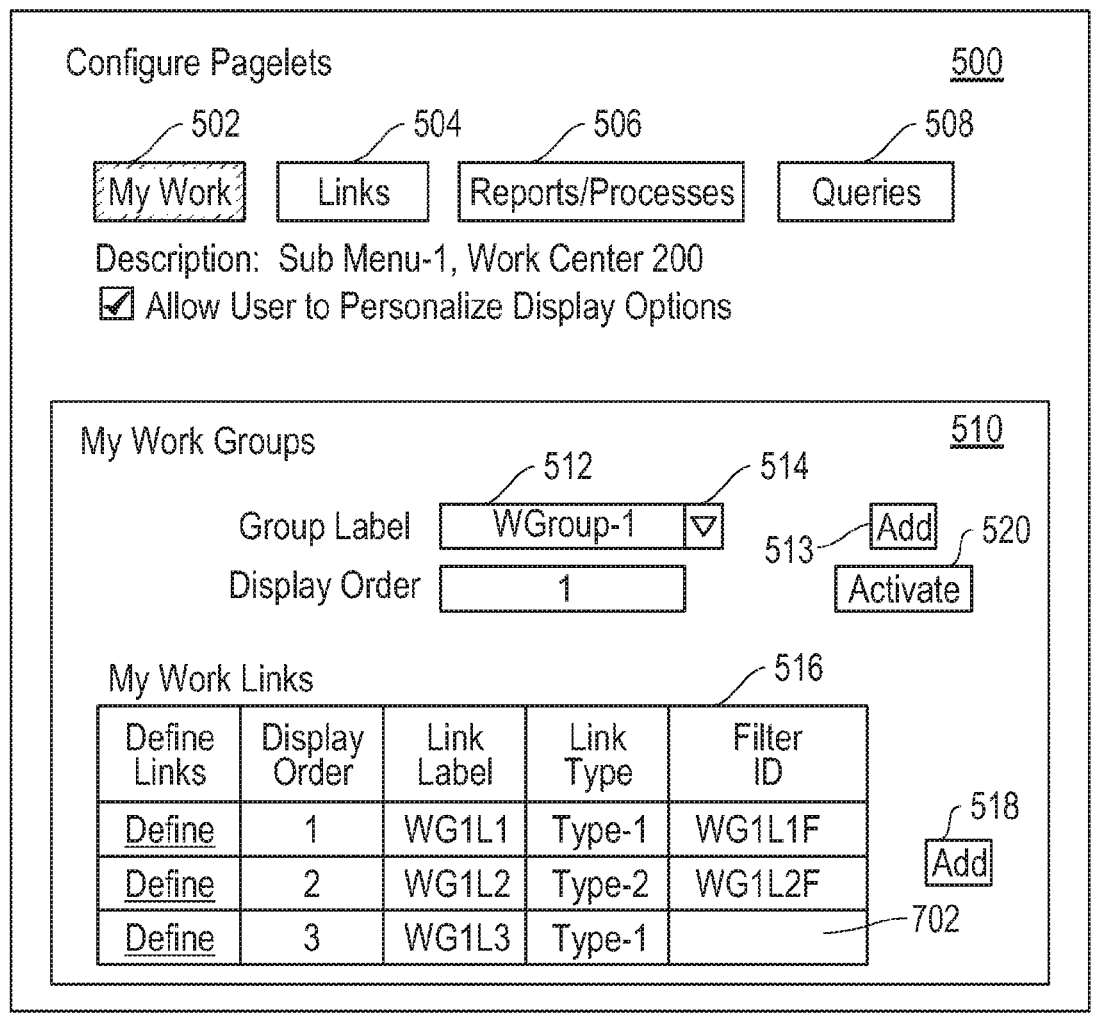
FIG. 7 shows the interface of FIG. 5 after it is updated with definitions for a newly added table entry.

Each entry of table 516 contains several columns including a column that defines the order in which the link of the entry is displayed in the workcenter, a column that identifies the workcenter display label for the link, a column that identifies the type of link (e.g., an alerts and notification type), and a column that identifies filter-ID more fully described below. Although not shown, a column in each entry allows a user to select the link as their starting page—this is the link that is activated when the user first navigates to the workcenter. Also another column, not shown, controls whether the link is shown and one that controls whether the corresponding My Work link count (e.g., the number of work items associated with the link) is displayed by the link in workcenter). Each table entry also includes an active "define" link, which when activated opens a separate page or interface where contents of many of the columns of the corresponding entry can be defined. FIG. 6 illustrates an example link definition interface 600 that is opened in response to the administrator activating the define link of the newly added entry in table 516 and adding information. Interface 600 includes at least three fields corresponding to three columns shown within table 516 of FIG. 5. Field 602 includes a drop down menu that enables an administrator to select one of several different types of preexisting searches of enterprise application system 110 that can be mapped to the corresponding pagelet link. In one embodiment, enterprise application system 110 may have four different types of preexisting searches that can be used to find work items: events and notification alert searches, system defined searches that are provided with the delivery enterprise application system 110, user defined searches created by an administrator after delivery of enterprise application system 110, and worklist searches that can be used to find business process routed work items. The administrator can select one of several searches existing for the type of search entered into field 602 using the prompt 610 of field 612. Field 612 shows "credit errors" as the type-1 existing search (e.g., alerts and notifications search) selected by the administrator in the illustrated example. Information entered into the fields of interface 600 are saved by activating the "save" button 614. FIG. 7 shows the interface of FIG. 5 updated with definitions for the newly added table entry.

An existing search that is mapped to a My Work link via interface 600 may return a large set of results when the search is executed by enterprise application system 110. Most of the time, a user is interested in only a subset of the search results. For example, an existing search may identify a large number of unapproved invoices, but a user may only be interested in those unapproved invoices that he created for a particular customer. Secondary search criteria can be used to filter out search results of interest to a user. With continuing reference to FIGS. 5 and 7 each entry of table 510 includes a field into which an administrator can enter a filter-ID via a hyperlink to a filter configuration more fully described below. My Work links are mapped to filters via filter-IDs. Users can subsequently map secondary search criteria to the My Work links via the filters mapped thereto as will be more fully described below. Ultimately, enterprise application system 110 filters the results of an executed search that is mapped to a My Work link using the user defined secondary search criteria that is mapped thereto.

FIG. 8 illustrates an example filter definition interface 800 that can be used for configuring a filter. Filter definition interface 800 includes a field 802 that identifies the filter-ID, which is mapped to a My Work link and linked to a search (e.g., Credit Errors) vis-à-vis definition interface 600. FIG. 8 shows the entry with filter-ID WG1L3F shown therein. Field 804 is used to identify the table on which the filter is based. Administrators can search for and select a table via prompt button 806. In the illustrated example, BI-HDR is selected, which is the table from which the "Credit Errors" search criteria are selected. The selected table will have fields or columns that can be specified for the secondary search that filters the search results. After the administrator identifies the filter table, a sub interface 808 with table 810 can be used to specify columns of the filter table that are to be used in the secondary search. Each entry of table 810 specifies a filter table column that is selected by the administrator for the secondary search. The administrator can add a new table entry using add button 812. A table column can be selected using the prompt 814. FIG. 8 shows columns "Business Unit" and "Customer" of the BI_HDR filter table as being selected for filter WG1L3F. Once the columns are selected for the filter, the administrator activates the save button 816, and the resulting filter is stored in memory.

Figure 9:
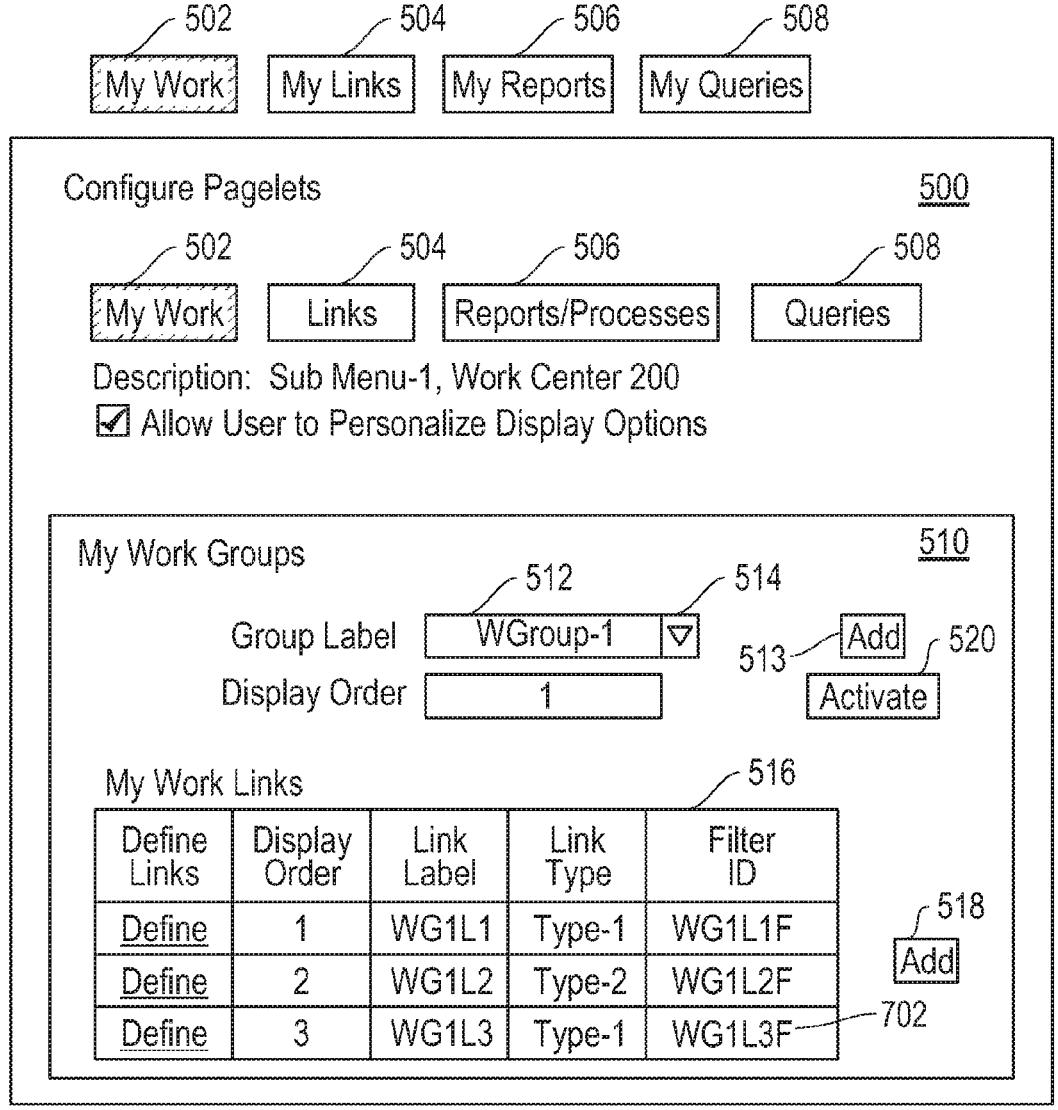
FIG. 9 shows the interface of FIG. 7 after an administrator enters a filter-ID illustrated in FIG. 8.

Once a filter is created in memory, it can be mapped to a My Work link. With continuing reference to FIGS. 7 and 8 the administrator can map a link to a filter using filter-ID hyperlink 702. A prompt enables the administrator search for the appropriate filter. FIG. 9 shows the interface of FIG. 7 after the administrator enters filter-ID WG1L3F illustrated in FIG. 8.

Figure 10A:
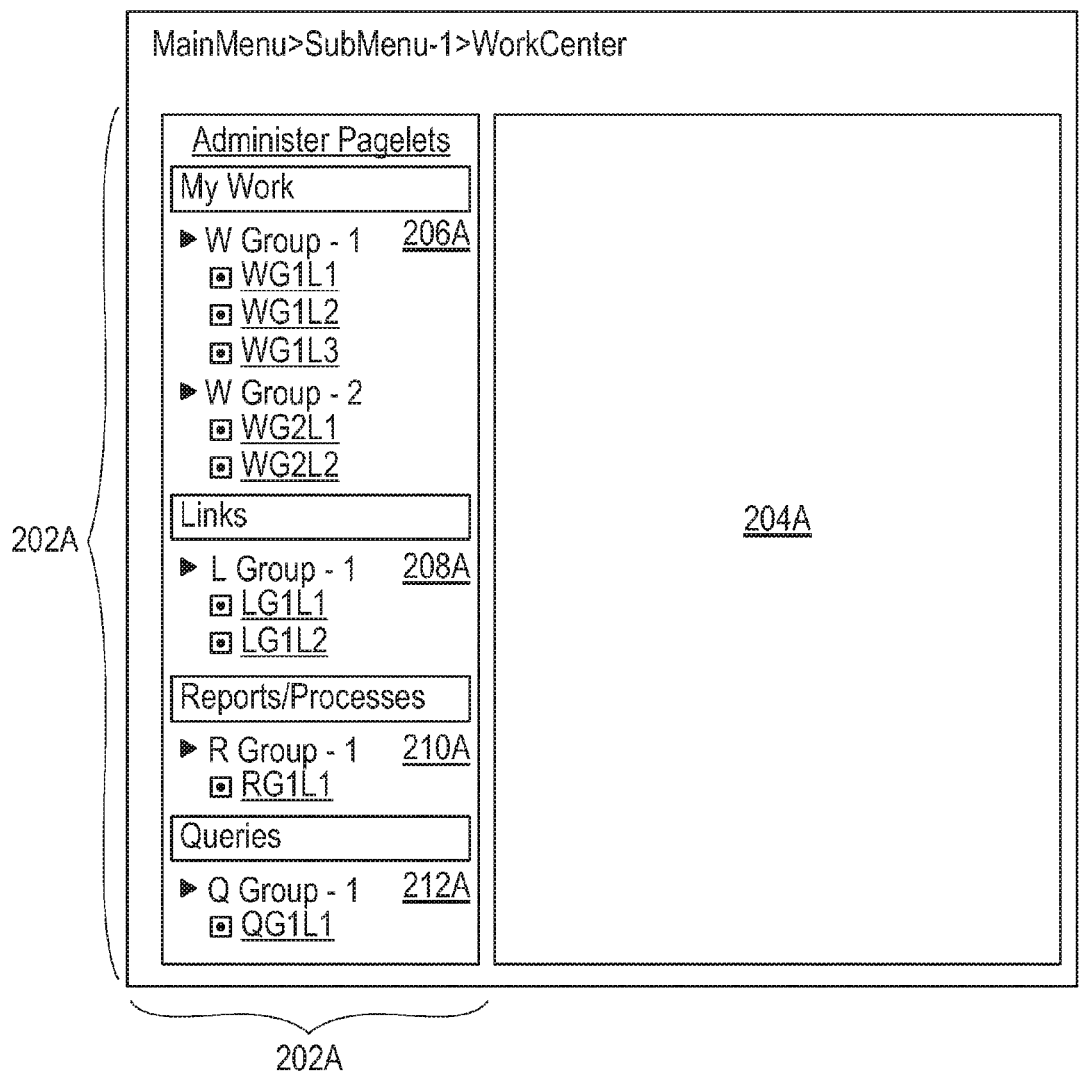
FIGS. 10A and 10B illustrate the workcenters of FIGS. 2A and 2B after an administrator has reconfigured a pagelet thereof.
Figure 10B:
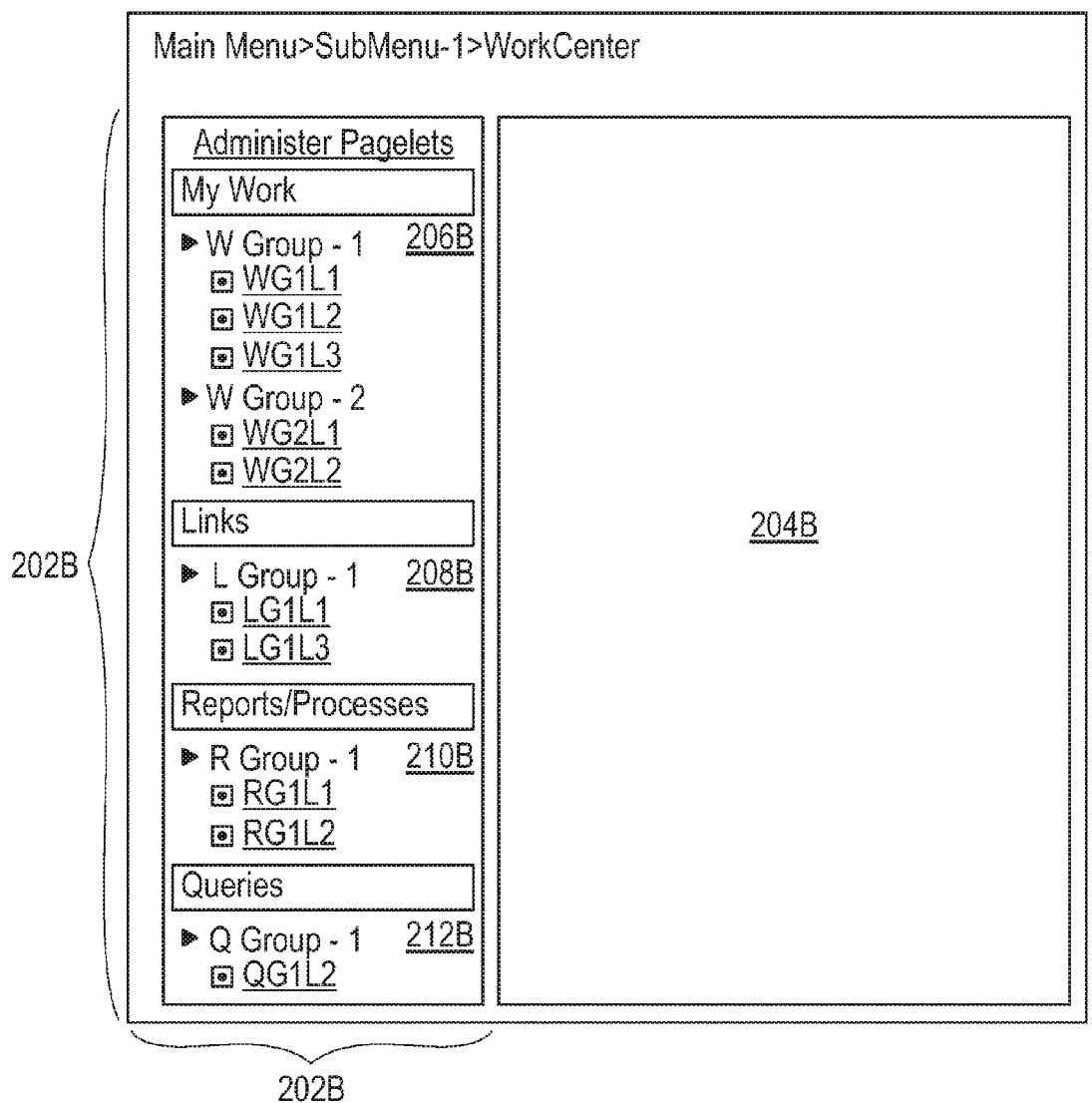

When finished creating or modifying the My Work pagelet (or any other pagelet), the administrator saves the workcenter configuration information using activation button 520. This action also updates the corresponding workcenters. FIGS. 10A and 10B illustrate workcenters 200A and 200B of FIGS. 2A and 2B with the updated configuration information. As seen in these figures, new pagelet link WG1L3 is added to the group WGroup-1.

Before a user activates a My Work pagelet link the user enters secondary search criteria via the filter mapped to the link. For example, before the user activates link WG1LF in workcenter 200A or workcenter 200B, the user should enter secondary search criteria for the filter (i.e., filter WG1LF) that is mapped to the link. FIG. 11 graphically illustrates an example interface 1100 where a user of workcenter 200A or 200B can enter secondary search criteria through a filter mapped to a link such as WG1L3. Interface 1100 of FIG. 11 includes fields corresponding to the table fields selected by the administrator in FIG. 8. The user can enter secondary search criteria into these fields. For example, the user of workcenter 200A may select "US001," which may be a business unit for which the user is responsible, and "CSLLP," which may be the identity of a customer. In contrast, when the user of workcenter 200B opens his interface 1100, he may enter "US002" into the business unit field and "SMMLLP" into the customer field. Once the fields of interface 1100 are completed, the user of workcenter 200A saves the secondary search criteria to memory, where it is mapped to link WG1L3 of his workcenter. When a user of workcenter 200A or 200B shown in FIGS. 10A and 10B activate My Work pagelet link WG1L3, the enterprise application system 110 will respond by implementing the mapped search (i.e., "Credit Errors"). The results of the search are subsequently filtered using the secondary search criteria US001 and CSLLP. The filtered results are then displayed in transaction area 204A.

Although the invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A non-transitory computer readable medium comprising instructions which, when executed by one or more hardware processors, causes performance of operations comprising:

displaying a filter definition interface;
receiving a first filter definition from a user via the filter definition interface;
storing the first filter definition for use in executing any of a plurality of queries;
responsive to receiving a first request for execution of a first query in the plurality of queries:
 identifying a first set of search results at least by (a) modifying the first query to include the first filter definition to obtain a modified first query and (b) executing the modified first query;
 displaying the first set of search results; and
responsive to receiving a second request for execution of a second query in the plurality of queries:
 identifying a second set of search results at least by (a) modifying the second query to include the first filter definition to obtain a modified second query and (b) executing the modified second query;
 displaying the second set of search results.

2. The medium of claim 1, wherein the operations further comprise:
subsequent to displaying the second set of search results:
receiving a modification to the first filter definition, via the filter definition interface, to obtain a modified filter definition;
storing the modified filter definition for use in executing any of the plurality of queries;
responsive to receiving a third request for execution of the first query in the plurality of queries:
 identifying a third set of search results based on (a) the first query and (b) the modified filter definition, wherein the third set of search results is different than the first set of search results;
 displaying the third set of search results; and
responsive to receiving a fourth request for execution of the second query in the plurality of queries:
 identifying a fourth set of search results based on (a) the second query and (b) the modified filter definition, wherein the fourth set of search results is different than the second set of search results;
 displaying the fourth set of search results.

3. The medium of claim 1, wherein the operations further comprise:
subsequent to displaying the second set of search results:
receiving a second filter definition via the filter definition interface;
storing the second filter definition, in addition to the first filter definition, for use in executing any of the plurality of queries;
responsive to receiving a third request for execution of the first query in the plurality of queries:
 identifying a third set of search results based on (a) the first query, (b) the first filter definition, and (c) the second filter definition;
 displaying the third set of search results; and
responsive to receiving a fourth request for execution of the second query in the plurality of queries:
 identifying a fourth set of search results based on (a) the second query, (b) the first filter definition, and (c) the second filter definition;
 displaying the fourth set of search results.

4. The medium of claim 1, wherein the operations further comprise:
subsequent to displaying the second set of search results:
receiving user input, via the filter definition interface, to remove the first filter definition;
removing the first filter definition from a set of one or more filter definitions to be used in executing any of the plurality of queries;
responsive to receiving a third request for execution of the first query in the plurality of queries:
 identifying a third set of search results based on the first query and without the use of the first filter definition;
 displaying the third set of search results; and
responsive to receiving a fourth request for execution of the second query in the plurality of queries:
 identifying a fourth set of search results based on the second query and without the use of the first filter definition;
 displaying the fourth set of search results.

5. The medium of claim 1, wherein the first filter definition comprises a value for a particular field, and wherein identifying the first set of search results based on the first filter definition comprises limiting the first set of search results corresponding to the value for the particular field.

6. The medium of claim 1, wherein the operations further comprise receiving and storing each of the plurality of queries prior to receiving the first filter definition.

7. The medium of claim 1, wherein modifying the first query is performed in response to determining that the first query is associated with the first filter definition, and wherein modifying the second query is performed in response to determining that the second query is associated with the first filter definition.

8. A method comprising:
displaying a filter definition interface;
receiving a first filter definition from a user via the filter definition interface;
storing the first filter definition for use in executing any of a plurality of queries;
responsive to receiving a first request for execution of a first query in the plurality of queries:
 identifying a first set of search results at least by (a) modifying the first query to include the first filter definition to obtain a modified first query and (b) executing the modified first query;
 displaying the first set of search results; and
responsive to receiving a second request for execution of a second query in the plurality of queries:
 identifying a second set of search results at least by (a) modifying the second query to include the first filter definition to obtain a modified second query and (b) executing the modified second query;
 displaying the second set of search results,
wherein the method is performed by at least one device including a hardware processor.

9. The method of claim 8, wherein the method further comprises:
subsequent to displaying the second set of search results:
receiving a modification to the first filter definition, via the filter definition interface, to obtain a modified filter definition;
storing the modified filter definition for use in executing any of the plurality of queries;
responsive to receiving a third request for execution of the first query in the plurality of queries:
 identifying a third set of search results based on (a) the first query and (b) the modified filter definition, wherein the third set of search results is different than the first set of search results;

displaying the third set of search results; and
responsive to receiving a fourth request for execution of the second query in the plurality of queries:
identifying a fourth set of search results based on (a) the second query and (b) the modified filter definition, wherein the fourth set of search results is different than the second set of search results;
displaying the fourth set of search results.

10. The method of claim 8, wherein the method further comprises:
subsequent to displaying the second set of search results:
receiving a second filter definition via the filter definition interface;
storing the second filter definition, in addition to the first filter definition, for use in executing any of the plurality of queries;
responsive to receiving a third request for execution of the first query in the plurality of queries:
identifying a third set of search results based on (a) the first query, (b) the first filter definition, and (c) the second filter definition;
displaying the third set of search results; and
responsive to receiving a fourth request for execution of the second query in the plurality of queries:
identifying a fourth set of search results based on (a) the second query, (b) the first filter definition, and (c) the second filter definition;
displaying the fourth set of search results.

11. The method of claim 8, wherein the method further comprises:
subsequent to displaying the second set of search results:
receiving user input, via the filter definition interface, to remove the first filter definition;
removing the first filter definition from a set of one or more filter definitions to be used in executing any of the plurality of queries;
responsive to receiving a third request for execution of the first query in the plurality of queries:
identifying a third set of search results based on the first query and without the use of the first filter definition;
displaying the third set of search results; and
responsive to receiving a fourth request for execution of the second query in the plurality of queries:
identifying a fourth set of search results based on the second query and without the use of the first filter definition;
displaying the fourth set of search results.

12. The method of claim 8, wherein the first filter definition comprises a value for a particular field, and wherein identifying the first set of search results based on the first filter definition comprises limiting the first set of search results corresponding to the value for the particular field.

13. The method of claim 8, wherein the method further comprises receiving and storing each of the plurality of queries prior to receiving the first filter definition.

14. The method of claim 8, wherein modifying the first query is performed in response to determining that the first query is associated with the first filter definition, and wherein modifying the second query is performed in response to determining that the second query is associated with the first filter definition.

15. A system comprising:
at least one device including a hardware processor;
the system being configured to perform operations comprising:
displaying a filter definition interface;
receiving a first filter definition from a user via the filter definition interface;
storing the first filter definition for use in executing any of a plurality of queries;
responsive to receiving a first request for execution of a first query in the plurality of queries:
identifying a first set of search results at least by (a) modifying the first query to include the first filter definition to obtain a modified first query and (b) executing the modified first query;
displaying the first set of search results; and
responsive to receiving a second request for execution of a second query in the plurality of queries:
identifying a second set of search results at least by (a) modifying the second query to include the first filter definition to obtain a modified second query and (b) executing the modified second query;
displaying the second set of search results.

16. The system of claim 15, wherein the operations further comprise:
subsequent to displaying the second set of search results:
receiving a modification to the first filter definition, via the filter definition interface, to obtain a modified filter definition;
storing the modified filter definition for use in executing any of the plurality of queries;
responsive to receiving a third request for execution of the first query in the plurality of queries:
identifying a third set of search results based on (a) the first query and (b) the modified filter definition, wherein the third set of search results is different than the first set of search results;
displaying the third set of search results; and
responsive to receiving a fourth request for execution of the second query in the plurality of queries:
identifying a fourth set of search results based on (a) the second query and (b) the modified filter definition, wherein the fourth set of search results is different than the second set of search results;
displaying the fourth set of search results.

17. The system of claim 15, wherein the operations further comprise:
subsequent to displaying the second set of search results:
receiving a second filter definition via the filter definition interface;
storing the second filter definition, in addition to the first filter definition, for use in executing any of the plurality of queries;
responsive to receiving a third request for execution of the first query in the plurality of queries:
identifying a third set of search results based on (a) the first query, (b) the first filter definition, and (c) the second filter definition;
displaying the third set of search results; and
responsive to receiving a fourth request for execution of the second query in the plurality of queries:
identifying a fourth set of search results based on (a) the second query, (b) the first filter definition, and (c) the second filter definition;
displaying the fourth set of search results.

18. The system of claim 15, wherein the operations further comprise:
subsequent to displaying the second set of search results:
receiving user input, via the filter definition interface, to remove the first filter definition;

removing the first filter definition from a set of one or more filter definitions to be used in executing any of the plurality of queries;

responsive to receiving a third request for execution of the first query in the plurality of queries:
  identifying a third set of search results based on the first query and without the use of the first filter definition;
  displaying the third set of search results; and
responsive to receiving a fourth request for execution of the second query in the plurality of queries:
  identifying a fourth set of search results based on the second query and without the use of the first filter definition;
  displaying the fourth set of search results.

19. The system of claim 15, wherein the first filter definition comprises a value for a particular field, and wherein identifying the first set of search results based on the first filter definition comprises limiting the first set of search results corresponding to the value for the particular field.

20. The system of claim 15, wherein the operations further comprise receiving and storing each of the plurality of queries prior to receiving the first filter definition.

21. The system of claim 15, wherein modifying the first query is performed in response to determining that the first query is associated with the first filter definition, and wherein modifying the second query is performed in response to determining that the second query is associated with the first filter definition.

* * * * *